US006508962B1

United States Patent
Economy et al.

(10) Patent No.: US 6,508,962 B1
(45) Date of Patent: Jan. 21, 2003

(54) CARBON FIBER ION EXCHANGER

(75) Inventors: James Economy, Urbana, IL (US);
Kelly Benak, Champaign, IL (US);
Lourdes Dominguez, Urbana, IL (US)

(73) Assignee: Board of Trustees of University of Illinois, Urbana, IL (US)

( * ) Notice: Subject to any disclaimer, the term of this patent is extended or adjusted under 35 U.S.C. 154(b) by 37 days.

(21) Appl. No.: 09/599,085

(22) Filed: Jun. 21, 2000

(51) Int. Cl.[7] .......................... B32B 9/00; C12N 11/08
(52) U.S. Cl. ................ 264/29.1; 428/292.4; 428/375; 428/368; 435/180; 427/228
(58) Field of Search ................ 428/292.4, 375, 428/368; 435/180; 264/29.1; 427/228

(56) References Cited

U.S. PATENT DOCUMENTS

| | | | |
|---|---|---|---|
| 4,045,338 A | | 8/1977 | Miyamoto et al. |
| 4,125,486 A | * | 11/1978 | Uzumaki et al. ............. 521/32 |
| 4,265,768 A | | 5/1981 | Beasley et al. |
| 4,312,956 A | * | 1/1982 | Chong et al. ............... 210/686 |
| 4,544,499 A | * | 10/1985 | Tran et al. ................. 210/682 |
| 4,693,828 A | * | 9/1987 | Yoshioka et al. ........... 210/679 |
| 5,204,376 A | * | 4/1993 | Henmi et al. ................. 521/29 |
| 5,318,846 A | | 6/1994 | Bruening et al. |
| 5,328,758 A | * | 7/1994 | Markell et al. ............. 156/199 |
| 5,350,523 A | | 9/1994 | Tomoi et al. |
| 5,547,760 A | | 8/1996 | Tarbet et al. |
| 5,580,770 A | * | 12/1996 | DeFilippi ................... 435/180 |
| 5,759,942 A | * | 6/1998 | Tan et al. ................... 502/168 |
| 5,834,114 A | | 11/1998 | Economy et al. |
| 6,036,726 A | * | 3/2000 | Yang et al. .................... 8/102 |
| 6,130,175 A | * | 10/2000 | Rusch et al. .................. 442/77 |

FOREIGN PATENT DOCUMENTS

| | | |
|---|---|---|
| DE | 3339756 A1 | 5/1985 |
| EP | 0 036 584 A2 | 9/1981 |
| EP | 0 045 824 A1 | 2/1982 |
| EP | 0 285 321 A2 | 10/1988 |
| EP | 0 608 539 A1 | 8/1994 |
| EP | 0 630 685 A1 | 12/1994 |
| WO | WO 99/61384 | 12/1999 |

OTHER PUBLICATIONS

Search Report for Patent Cooperation Treaty application No. PCT/US 01/41081, Date of Mailing Nov. 9, 2001, 7 pages.
Search Report for Patent Cooperation Treaty application No. PCT/US 01/19952, Date of Mailing Nov. 14, 2001, 8 pages.
Search Report for Patent Cooperation Treaty application No. PCT/US 01/19946, Date of Mailing Nov. 14, 2001, 8 pages.
Robert Kunin—"Six Decades of Ion Exchange Technology at Rohm and Haas", Chemical Heritage 17:2, pp. 8, 9, 36–41 (1999).
James Economy—"Now that's an interesting way to make a fiber", Chemtech, vol. 10, pp. 240–247 (1980).
Andreas G. Andreopoulos—"Thermally Activated Phenolic Fibers", Chemistry of Materials, vol. 3, No. 4, pp. 594–597 (1991).

(List continued on next page.)

Primary Examiner—Cynthia H. Kelly
Assistant Examiner—Kimberly T. Nguyen
(74) Attorney, Agent, or Firm—Sonnenschein Nath & Rosenthal

(57) ABSTRACT

A composite, contains substrate fibers, and carbon ion exchanger, on the substrate fibers. The fiber provides a support to the carbon ion exchanger, resulting in excellent mechanical properties, compared to carbon fiber ion exchangers.

13 Claims, 1 Drawing Sheet

OTHER PUBLICATIONS

E. Dimotakis et al.—"Water Vapor Adsorption on Chemically Treated Activated Carbon Cloths", Chemistry of Materials, vol. 7, pp. 2269–2272 (1995).

K.L. Foster et al.—Adsorption Characteristics of Trace Volaitle Organic Compounds in Gas Streams onto Activated Carbon Fibers, Chemistry of Materials, vol. 4, pp. 1068–1073 (1992).

Ruey Y. Lin et al.—"The Preparation and Properties of Activated Carbon Fibers Derived from Phenolic Precursor", Applied Polymer Symposium, No. 21, pp. 143–152 (1973).

James Economy et al.—"Tailoring Carbon Fibers for Adsorbing Volatiles", Chemtech, pp. 597–603 (1992).

James Economy et al.—"Adsorption Characteristics of Activated Carbon Fibers", Applied Polymer Symposium, No. 29, pp. 199–211 (1976).

George Odian—"Crosslinking Technology", Principles of Polymerization, Third Edition, pp. 125–132 (1991).

William Ayles—"Phenolic", Modern Plastics Encyclopedia Handbook, pp. 78–80 (1994).

Abstract for "Carborundum Process Converts Pitch Into Non–Flammable Fiber", Industrial Research vol. IR–100, Circle 231, 1 page (1972).

I. N. Ermanlenko et al.—"Properties of Sorption–Active Carbon Fibers", Chemically Modified Carbon Fibers, 3.6, pp. 59–73 (1990).

I. N. Ermanlenko et al.—"Surface Modification of Carbon Fibers", Chemically Modified Carbon Fibers, 6, pp. 59–73 (1990).

* cited by examiner

CARBON FIBER ION EXCHANGER

FEDERALLY SPONSORED RESEARCH OR DEVELOPMENT

The subject matter of this application was in part funded by the National Science Foundation (Grant no. DMR-97-12489; UFAS No.1-5-31414). The government may have certain rights in this invention.

BACKGROUND

The present invention relates to ion exchange materials.

Ion exchange materials have been used for purification and demineralization. These materials have a three-dimensional network to which ions are attached. In ion exchange resins, the three-dimensional network is a polymer. In carbon ion exchangers, the three-dimensional network is activated carbon.

Carbon ion exchangers may be prepared in a variety of forms, including, for example, fibers. These carbon fiber ion exchangers are described in "Tailoring Carbon Fibers for Adsorbing Volatiles" Economy, James, et al.CHEMTECH (1992), 22(10), 597–603.; "Properties of Sorption-Active Carbon Fibers" section 3.6 of Chemically Modified Carbon Fibers and Their Applications, Ermolenko, I. N., et al., translated by Titovets, E. P., VCH Publishers, Inc., New York, 1990.; and "Surface Modification of Carbon Fibers" Chapter 6 of Chemically Modified Carbon Fibers and Their Applications, Ermolenko, I. N., et al., translated by Titovets, E. P., VCH Publishers, Inc., New York, 1990. The material may be prepared by first making activated carbon fibers (ACFs), and then introducing ionic groups into the ACFs by chemical reaction with modifying agents, such as, for example, sulfonation with concentrated sulfuric acid, or phosphorylation with phosphorus trichloride.

Carbon fiber ion exchangers that contain strongly acidic groups, such as sulfonic groups, are of particular interest, because of the ability of these materials to remove difficult to coordinate ions, such as $Cs^+$. These ions may be present as radioactive ions in contaminated water. The capacity of an ion exchanger to remove these ions can be determined by measuring the capacity of the ion exchanger at low pH, such as at a pH of 1. It would be desirable to have carbon fiber ion exchangers with greater capacity at low pH.

Since carbon fiber ion exchangers are typically made from ACFs, they suffer from some of the same disadvantages. For example, extreme weight loss results during the production of ACFs, limiting their cost-effectiveness. Furthermore, ACFs are usually brittle or frangible, due to producing these fibers by carbonization at high temperatures; these poor mechanical properties limit their utility to systems containing some sort of mechanical support, and make it difficult or expensive to produce forms such as woven fabrics, felts and papers.

Glass or mineral fibers, coated with activated carbon, have been prepared. These materials are described in U.S. Pat. No. 5,834,114. Glass or mineral fibers coated with activated carbon are described as being prepared by coating a glass or mineral fiber substrate with a resin, cross-linking the resin, heating the coated fiber substrate and resin to carbonize the resin, and exposing the coated fiber substrate to an etchant to activate the coated fiber substrate.

BRIEF SUMMARY

In a first aspect, the invention includes a composite, containing (i) substrate fibers, and (ii) carbon ion exchanger, on the substrate fibers.

In a second aspect, the invention includes a method of making a composite, including introducing ionic groups into an activated coating, to form a carbon ion exchanger. The activated coating is on substrate fibers.

The term "carbon ion exchanger" means an ion exchange material made from an activated coating.

The term "activated coating" means a material that contains carbon and has a B.E.T. surface area of at least 50 $m^2/g$. This term includes activated carbon.

The term "carbon fiber ion exchanger" means an ion exchange material made from an activated carbon fiber.

The term "carbon ion exchanger composite fiber" means an ion exchange material made from an activated coating, that is present on a fiber.

The term "ion exchange material" means ion exchange materials as well as materials that contain groups capable of chelating ions.

DETAILED DESCRIPTION

Figure 1:
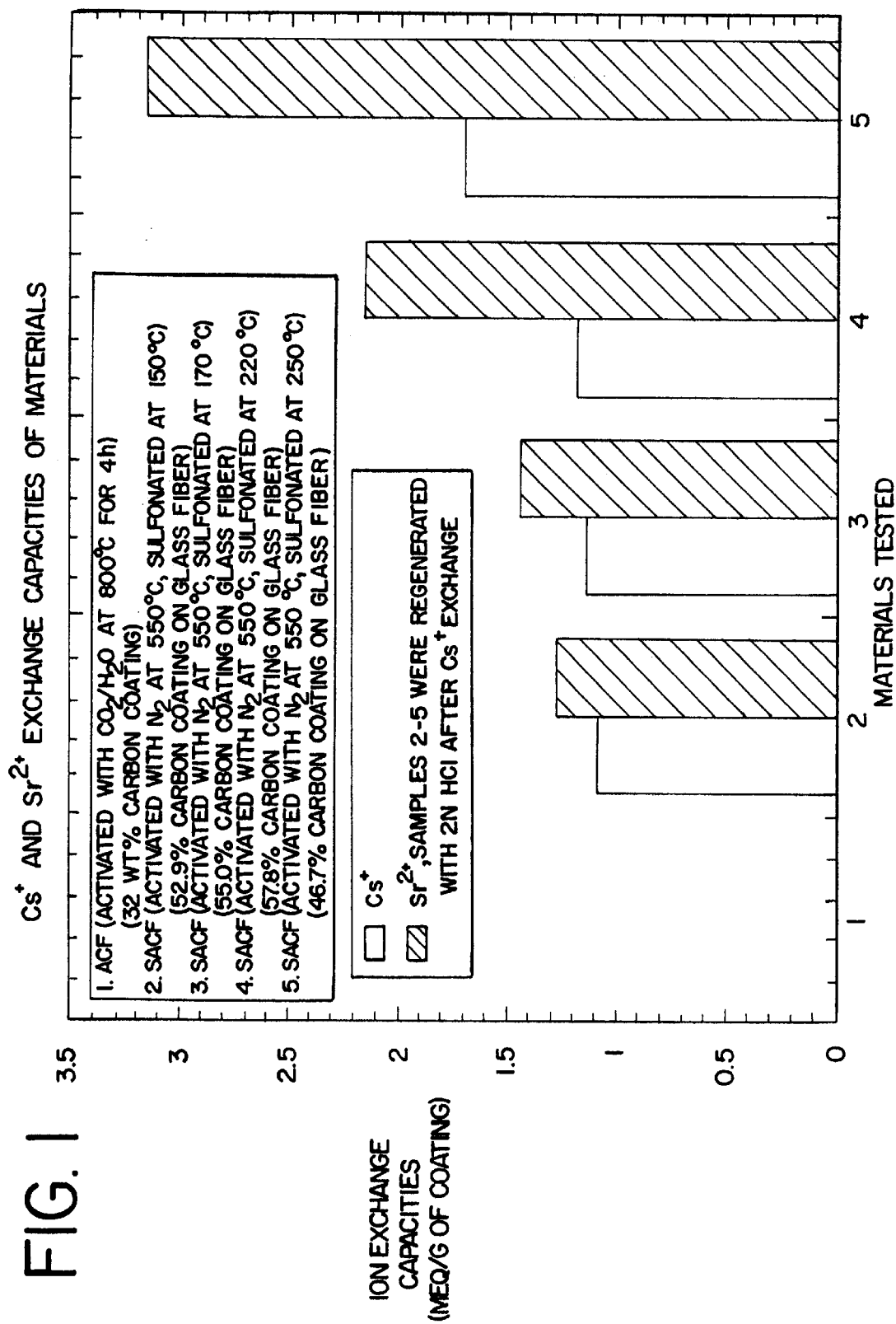
FIG. 1 compares the $Cs^+$ and $Sr^{2+}$ ion exchange capacities of a carbon fiber ion exchanger and a variety of carbon ion exchanger composite fibers.

The present invention includes carbon ion exchanger composite fibers, which contain a carbon ion exchanger on substrate fibers. The carbon ion exchanger preferably includes strongly acidic groups capable of removing difficult to coordinate ions. The substrate fibers provide support to the carbon ion exchanger, resulting in excellent mechanical properties, compared to carbon fiber ion exchangers. In addition, the capacity measured at a pH of 1 of preferred carbon ion exchanger composite fibers is much greater than carbon fiber ion exchangers that have had the ionic groups introduced under otherwise identical conditions.

The substrate fibers may include any material that can tolerate the conditions necessary to form the activated coating. Examples include natural fibers, HEPA filters, e-glass fibers, synthetic fibers used in clothing, polyesters, polyethylene, polyethylene terephthalate, nylon 6, nylon 66, polypropylene, KEVLAR™, liquid crystalline polyesters, and syndiotactic polystyrene. Other examples include natural and synthetic fibers, for example: glass fibers; mineral fibers such as asbestos and basalt; ceramic fibers such as $TiO_2$, SiC, and BN; metal fibers such as iron, nickel and platinum; polymer fibers such as TYVEK™; natural fibers such as cellulose and animal hair; and combinations thereof. Some preferred substrate fibers are listed in the table below.

| Company | Product Line | Description |
| --- | --- | --- |
| CRANE & CO. | Crane 230 (6.5 μm) | Non-woven Fiber Glass Mats |
|  | Crane 232 (7.5 μm) | Non-woven Fiber Glass Mats |
| FIBRE GLAST | 519 (0.75 oz.) | wovens |
|  | 573 (9 oz.) | wovens |
| HOLLINGSWORTH & VOSE | BG05095 HE1021 | glass paper or felts |
| JOHNS MANVILLE | DURAGLASS® 7529 (11 μm) | non-woven fiber glass mats |
| LYDALL MANNING | MANNIGLAS® | non-woven fiber glass mats |
| DUPONT | TYVEK® | HDPE Spun bonded paper |

The carbon ion exchanger composite fibers may be present in any form. Examples include loose fibers, woven and non-woven fabrics, papers, felts and mats. The carbon ion exchanger composite fibers may be made from a substrate fibers already present in a specific form, or the carbon ion exchanger composite fibers may first be prepared from loose substrate fibers, and made into the specific form.

The length of the carbon ion exchanger composite fibers is not limited, and may be, for example, 0.01 mm to 100 m in length. The carbon ion exchanger composite fibers may be prepared from longer substrate fibers, then cut or chopped. Furthermore, the diameter of the carbon ion exchanger composite fibers is also not limited, and may be, for example 100 Å to 1 mm in diameter. The aspect ratio of the fibers is preferably at least 10.

The carbon ion exchanger of the carbon ion exchanger composite fibers may be present on isolated regions on the surface of the substrate fibers, may completely enclose the substrate fibers, or enclose all of the substrate fibers except the ends of the substrate fibers. For example, if the substrate fibers were completely enclosed by the carbon ion exchanger, then chopping would result in the ends of the fibers being exposed.

The weight ratio between the carbon ion exchanger and the substrate fibers in the carbon ion exchanger composite fibers is not limited, but does affect final properties. For example, if the amount of carbon ion exchanger is very large compared to the amount of substrate fibers, then the brittleness of the carbon ion exchanger may reduce the flexibility of the carbon ion exchanger composite fibers. Preferably, the carbon ion exchanger composite fibers include 1 to 90% by weight of carbon ion exchanger, more preferably 5 to 80% by weight of carbon ion exchanger, including 20%, 30%, 40%, 50%, 60%, and 70% by weight of carbon ion exchanger. These ratios may also be expressed as the fraction of the fiber diameter that is carbon ion exchanger, when the carbon ion exchanger surrounds at least the body of the fibers. Preferably, the carbon ion exchanger is 10 to 90% of the substrate fiber diameter, more preferably 20 to 80% of the substrate fiber diameter, including 30%, 40%, 50%, 60% and 70% of the substrate fiber diameter.

The carbon ion exchanger composite fibers may be prepared by coating the substrate fibers with a material, and then converting the material into an activated coating, thus producing fibers coated with the activated coating. Next, ionic groups may be introduced into the activated coating by chemical reaction with modifying agents.

Materials that may be converted into the activated coating are well known, and include a variety of polymers which are known to be able to be converted into activated carbon: thermoplastic polymer; phenolic resins such as resoles and novolacs; cellulose; and polyvinyls. Phenolic polymers including resoles and novolacs, are described in "Principles of Polymerization", 3rd ed., George Odian (John Wiley & Sons, 1991), pp. 125–132. These materials may be coated onto the substrate fibers by dip coating or spraying in liquid form. The liquid form may be a solution of the material in a solvent, a melt of the material, or a liquid precursor of the material such as a monomer that is then polymerized after coating onto the substrate fiber. These materials are often converted to the activated coating by heating. Examples of materials, and methods of converting them into the activated coating, as well as substrate fibers suitable for specific materials, are described in U.S. Pat. No. 5,834,114, hereby incorporated by reference. In addition, the activated organic coatings described in U.S. patent application Ser. No. 09/599,084, filed Jun. 21, 2000, entitled "Activated Organic Coatings On A Fiber Substrate", the contents of which are hereby incorporated by reference, may be used as the activated coatings. Other suitable materials are also described in "Tailoring Carbon Fibers for Adsorbing Volatiles" Economy, James, et al.CHEMTECH (1992), 22(10), 597–603.; "Properties of Sorption-Active Carbon Fibers" section 3.6 of Chemically Modified Carbon Fibers and Their Applications, Ermolenko, I. N.,et al., translated by Titovets, E. P., VCH Publishers, Inc., New York, 1990.; and "Surface Modification of Carbon Fibers" Chapter 6 of Chemically Modified Carbon Fibers and Their Applications, Ermolenko, I. N.,et al., translated by Titovets, E. P., VCH Publishers, Inc., New York, 1990. The selection of substrate fibers is limited to those substrate fibers that are not destroyed by the conditions necessary to convert the chosen material into the activated coating.

The activated coating is converted into a carbon ion exchanger by reaction with a reagent that bonds ion exchange groups to the activated coating. Examples of reagents and conditions suitable to add ion exchange groups are describe in "Tailoring Carbon Fibers for Adsorbing Volatiles" Economy, James, et al.CHEMTECH (1992), 22(10), 597–603.; "Properties of Sorption-Active Carbon Fibers" section 3.6 of Chemically Modified Carbon Fibers and Their Applications, Ermolenko, I. N., et al., translated by Titovets, E. P., VCH Publishers, Inc., New York, 1990.; and "Surface Modification of Carbon Fibers" Chapter 6 of Chemically Modified Carbon Fibers and Their Applications, Ermolenko, I. N., et al., translated by Titovets, E. P., VCH Publishers, Inc., New York, 1990. In the present invention, preferably acidic groups, more preferably strong acid groups, even more preferably sulfonate ($—SO_3^-$) groups and sulfonic acid ($—SO_3H$) groups, are present in the carbon ion exchanger, resulting in a cationic exchanger. Preferably, sulfonic groups are added by exposing the substrate fibers coated with the activated coating to sulfuric acid, more preferably concentrated sulfuric acid, for a time period of 1 minute to 24 hours, at a temperature of 130 to 240° C. It is also possible to hydrogenate the activated coating, for example at 900° C., prior to conversion into a carbon ion exchanger, as described in "Tailoring Carbon Fibers for Adsorbing Volatiles" Economy, James, et al. CHEMTECH (1992), 22(10), 597–603.

Anionic exchangers are also possible, for example, by forming the activated coating from a phenolic resin, in the presence of ammonia, to a temperature of up to 800° C., giving pyridine groups in the activated coating, followed by reaction with an alkyl halide, such as methyl iodide, to functionalize the pyridine. The activated coating used to form this anionic exchanger are the activated carbon described in U.S. Pat. No. 5,834,114.

The presence and amount of strong acid groups can be determined by measuring the capacity of an ion exchange material at a pH of 1. Cation capacity may be determined in a conventional manner, as described in Kunin, R., Elements of Ion Exchange; Reinhold Publishing Corp., (New York, 1960). Specifically, in a 150-ml beaker is added 50 m of 1M sodium chloride solution (excess), <0.5-g sample of the carbon ion exchanger composite fibers, and two drops of phenolphthalein indicator. The contents are stirred and titrated with standard 0.1-M sodium hydroxide solution. The volume of sodium hydroxide used, times the normality per gram of carbon ion exchanger in the carbon ion exchanger composite fibers, is representative of the normalized loading capacity in meq/g units. The carbon ion exchanger composite fibers preferably have a cation capacity at a pH of 1 of more than 1.3 meq/g carbon ion exchanger, more preferably at least 1.4 meq/g carbon ion exchanger, even more preferably at least 1.8 meq/g carbon ion exchanger, even more preferably 2.0 meq/g carbon ion exchanger, and most preferably at least 3.0 meq/g carbon ion exchanger. Examples include a cation capacity at a pH of 1 of 1.4 to 6.0 meq/g carbon ion exchanger, 1.7 to 5.0 meq/g carbon ion exchanger, 1.9 to 4.0 meq/g carbon ion exchanger, and 2.0 to 3.0 meq/g carbon ion exchanger.

Capacity at pH of 10 may be measured as follows: to a bottle beaker is added 100 ml of 0.05M sodium hydroxide solution (excess) and 0.5-g of sample. The contents are shaken for one hour to ensure the solution has come to equilibrium. The solution is then back titrated with standard 0.1-M hydrochloric acid solution using a phenolphthalein indicator. The mmol of hydrochloric acid subtracted from the mmol of initial sodium hydroxide per gram of exchange material is representative of the normalized loading capacity in meq/g units.

EXAMPLES

The following examples and preparations are provided merely to further illustrate the invention. The scope of the invention is not construed as merely consisting of the following examples.

Example 1

Preparation of Activated Carbon Fiber (ACF) Ion Exchangers

As a comparative example, the phenolic fiber Kynol™, was used as the precursor to produce activated carbon fibers. This fiber can be readily carbonized and activated to a wide range of surface areas.

I. Carbonization and Activation of Kynol™ Precursor

The phenolic fibers were heated under nitrogen flow at temperatures between 500° C. and 600° C., to produce carbon fibers with surface areas ranging from <1–600 m$^2$/g.

II. Functionalization

All carbonized fibers were functionalized in 150-ml concentrated sulfuric acid for 3.5 hours at a temperature of 220° C. After activation, the samples were rinsed thoroughly in distilled water and soxhlet extracted with water for twelve hours to remove any residual acid. The samples were dried for twelve hours in air at a 130° C. prior to capacity determinations.

III. Batch capacity experiments

The cation capacity was determined in a conventional manner. In a 150-ml beaker was added 50 ml of 1M sodium chloride solution (excess) and 0.5-g fiber sample. The contents were shaken for one hour to ensure the solution had come to equilibrium. The solution was titrated with standard 0.1-M sodium hydroxide solution using a phenolphthalein indicator. The volume of sodium hydroxide used, times the normality per gram of exchange material, is representative of the normalized loading capacity in meq/g units. Carbon yields, surface areas, and cation exchange capacities of precursor Kynol fibers carbonized at 500, 550, and 600° C. are presented in Table 1. The sulfonation process created sulfonic acid functionalities that could effectively exchange at all pH ranges. It was found that oxidation of the microporous carbon accompanied the high temperature sulfonation of these systems, creating carboxylic acid and phenolic hydroxyl functionalities, which further enhanced the exchange capacity of these materials at higher pH. The data shows that at higher carbonization temperatures, the reactivity of the fiber for sulfonation decreases, likely due to the deactivation of the ring structure.

TABLE 1

Characteristics of ACFs at Varying Carbonization Temperatures

| Carbonization Temperature (° C.) | Carbon Yield (%) | BET Surface Area (m$^2$/g) | Capacity pH = 1 (meq/g) | Capacity pH = 10 (meq/g) |
|---|---|---|---|---|
| 500 | 73.49 | 0 | 1.3 | 3.6 |
| 550 | 67.58 | 25 | 1.0 | 3.0 |
| 600 | 60.13 | 550 | 0.3 | 2.7 |

IV. Regeneration studies

After each capacity run, samples were regenerated with a solution of 2N HCl acid, rinsed thoroughly with deionized water and thoroughly dried overnight. After each cycle, samples were weighed directly after drying to keep water adsorption to a minimum for capacity measurements. After multiple regenerations, these materials were found to exhibit a 100% working capacity.

Example 2

Preparation of Ion Exchanging Activated Coatings Supported On Glass Fiber Substrates (Carbon Ion Exchanger Composite Fibers)

I. Preparation of Phenolic Coated Glass Fiber 25 g of novolac were mixed with 1.7 g hexamethylenetetramine, and then dissolved in 100 mL ethanol. Preweighed samples of non-woven glass fibers were dipped into the resin solution and cured in a tube furnace under argon at a flow rate of 130–200 mL/min. The coated fiberglass was heated in the furnace to 100° C. for 20 minutes to remove the solvent. The coated fiberglass was then cured, first by heating the coated fiberglass to 150° C. over 20 minutes followed by an additional 20 minutes. The resultant fiber has a 65 wt % resin coating.

II. Carbonization and Activation

The phenolic-coated glass fiber was heated under nitrogen flow at 550° C. to produce the activated char on glass fibers. The coating yield of this system was 85%.

III. Functionalization

The carbonized fiber was functionalized in 150-ml concentrated sulfuric acid for 1 hour at a temperature of 220° C. After sulfonation, the sample was rinsed thoroughly in distilled water and soxhlet extracted with water for twelve hours to remove any residual acid. The sample was dried twelve hours in air at a 130° C. prior to capacity determinations. The coating after sulfonation of the system was 57.8 wt %.

III. Batch capacity experiments

The ion exchange capacity of the prepared fiber at a pH of 1 was 2.0 meg/g coating (due to functionalization of the fiber surface with sulfonic acid units), and at a pH of 10 was 4.8 meq/g coating.

IV. Regeneration studies

After each capacity run, samples were regenerated with a solution of 2N HCl acid, rinsed thoroughly with deionized water and thoroughly dried overnight. After each cycle, samples were weighed directly after drying to keep water adsorption to a minimum for capacity measurements. After multiple regenerations, these materials were found to exhibit a 100% working capacity.

Example 3
Preparation of Ion Exchanging Activated Coatings Supported On Glass Fiber Substrates Using Chemical Activation Techniques I. Preparation of Phenolic Coated Glass Fiber 15 g of novolac were mixed with 1 g hexamethylenetetramine and 13.95 g $ZnCl_2$, and then dissolved in 100 mL ethanol. Preweighed samples of non-woven glass fibers were dipped into the resin solution and cured in a tube furnace under argon at a flow rate of 130–200 mL/min. The coated fiberglass was heated in the furnace to 100° C. for 20 minutes to remove the solvent. The coated fiberglass was then cured, first by heating the coated fiberglass to 150° C. over 20 minutes followed by an additional 20 minutes. The resultant fiber has a 65 wt % resin coating.

II. Carbonization and Activation

The phenolic-coated glass fiber was heated under nitrogen flow at 350° C. to produce an activated coating on glass fibers. The coating yield of this system was 95%. The fiber was washed with distilled water followed by 0.1 N HCl three times to remove residual zinc residues from the pore structure. The surface area of the resultant material was 600 $m^2$/g coating.

III. Functionalization

The coated fiber was functionalized in 150-ml concentrated sulfuric acid for 1 hour at a temperature of 220° C. After sulfonation, the sample was rinsed thoroughly in distilled water and soxhlet extracted with water for twelve hours to remove any residual acid. The sample was dried twelve hours in air at a 130° C. prior to capacity determinations. The coating after sulfonation of the system was 61.8 wt %.

III. Batch capacity experiments

The ion exchange capacity of the prepared fiber at a pH of 1 was 3.0 meg/g coating (due to functionalization of the fiber surface with sulfonic acid units), and at a pH of 10 was 6.0 meq/g coating.

IV. Regeneration studies

After each capacity run, samples were regenerated with a solution of 2N HCl acid, rinsed thoroughly with deionized water and thoroughly dried overnight. After each cycle, samples were weighed directly after drying to keep water adsorption to a minimum for capacity measurements. After multiple regenerations, these materials were found to exhibit a 100% working capacity.

These examples show that the cation capacity at a pH of 1 of the carbon ion exchanger composite fibers is greater than the capacity of carbon fiber ion exchanger, in which the ionic groups have been added under otherwise identical conditions. Example 1 shows three different carbon fiber ion exchangers, having a cation capacity at a pH of 1 of 1.3, 1.0 and 0.3 meq/g coating. In contrast, Examples 2 and 3, the carbon ion exchanger composite fibers, have a cation capacity at a pH of 1 of 2.0 and 3.0 meq/g coating.

FIG. 1 illustrates $Cs^+$ and $Sr^{2+}$ exchange capacities carbon fiber ion exchanger (ACF, Sample 1), compared to carbon ion exchanger composite fibers of the present invention (SACF, Samples 2–5). The term "carbon coating" used in the figure refers to the carbon ion exchanger coating. These exchange capacities we measured as follows: To a bottle beaker was added 25 ml of 1000 ppm cesium chloride solution (excess) and 0.02–0.045 g sample. The contents were shaken for one hour to ensure the solution had come to equilibrium. The residual concentration of the solution was measured by atomic absorption. The mmol of $Cs^+$ adsorbed (difference between stock and residual concentrations) per gram of exchange material is representative of the normalized loading capacity in meq/g units. Sr capacity was measured exactly as Cs capacity, except replacing cesium chloride with strontium chloride.

Obviously, numerous modifications and variations of the present invention are possible in light of the above teachings. It is therefore to be understood that within the scope of the appended claims, the invention may be practiced otherwise than as specifically described herein.

What is claimed is:

1. A method of making a composite, comprising:

introducing ionic groups into an activated coating, to form a carbon ion exchanger;

wherein said activated coating is on substrate fibers.

2. The method of claim 1, wherein said composite has a cation capacity at a pH of 1 of more than 1.3 meq/g carbon ion exchanger.

3. The method of claim 2, wherein said cation capacity at a pH of 1 is at least 2.0 meq/g carbon ion exchanger.

4. The method of claim 2, wherein said cation capacity at a pH of 1 is 2.0 to 3.0 meq/g carbon ion exchanger.

5. The method of claim 1, wherein said substrate fibers comprise glass.

6. The method of claim 1, wherein said introducing comprises chemical reaction with sulfuric acid.

7. The method of claim 1, further comprising:

coating said substrate fibers with a material; and forming said activated coating from said material.

8. The method of claim 7, wherein said material comprises a phenolic resin.

9. The method of claim 3, wherein said introducing comprises chemical reaction with sulfuric acid.

10. The method of claim 6, wherein said substrate fibers comprise glass.

11. The method of claim 10, further comprising:

coating said substrate fibers with a material; and forming said activated coating from said material.

12. The method of claim 11, wherein said material comprises a phenolic resin.

13. The method of claim 1, wherein carbon ion exchanger is an anionic exchanger.

* * * * *